United States Patent
Fox et al.

(10) Patent No.: US 11,829,386 B2
(45) Date of Patent: Nov. 28, 2023

(54) IDENTIFYING ANONYMIZED RESUME CORPUS DATA PERTAINING TO THE SAME INDIVIDUAL

(71) Applicant: HG Insights, Inc., Santa Barbara, CA (US)

(72) Inventors: Robert J. Fox, Santa Barbara, CA (US); Samuel B. Chapin, Santa Barbara, CA (US); Jonathan C. Frey, Santa Barbara, CA (US); Christopher R. Fredregill, Santa Barbara, CA (US)

(73) Assignee: HG INSIGHTS, INC., Santa Barbara, CA (US)

(*) Notice: Subject to any disclaimer, the term of this patent is extended or adjusted under 35 U.S.C. 154(b) by 22 days.

(21) Appl. No.: 16/777,350

(22) Filed: Jan. 30, 2020

(65) Prior Publication Data
US 2021/0240737 A1    Aug. 5, 2021

(51) Int. Cl.
G06F 16/00      (2019.01)
G06F 16/28      (2019.01)
G06F 16/2455    (2019.01)
G06F 16/2458    (2019.01)
G06F 16/23      (2019.01)

(52) U.S. Cl.
CPC ........ G06F 16/285 (2019.01); G06F 16/2379 (2019.01); G06F 16/2468 (2019.01); G06F 16/24558 (2019.01)

(58) Field of Classification Search
CPC .............. G06F 16/285; G06F 16/2468; G06F 16/24558; G06F 16/2379
USPC .................................................. 707/600–899
See application file for complete search history.

(56) References Cited

U.S. PATENT DOCUMENTS

| 7,685,201 B2* | 3/2010 | Zeng ..................... G06F 16/338 704/9 |
| 8,171,026 B2 | 5/2012 | Kawatani |
| 8,548,929 B1 | 10/2013 | Goodwin et al. |

(Continued)

FOREIGN PATENT DOCUMENTS

| CN | 110209659 A | 9/2019 |
| CN | 110413742 A | 11/2019 |

OTHER PUBLICATIONS

Catherine, R., K. Visweswariah, V. Chenthamarakshan, N. Kambhatla, Prospect: A system for screening candidates for recruitment, CIKM'10, Oct. 26-29, 2010, Toronto, Ontario, Canada, pp. 659-668.

(Continued)

*Primary Examiner* — Irete F Ehichioya
*Assistant Examiner* — Shirley D Hicks
(74) *Attorney, Agent, or Firm* — LYON & HARR, LLP; Richard T. Lyon

(57) ABSTRACT

Resume data identification implementations are described that identify anonymized resume corpus data pertaining to the same individual. In one implementation, identifying this data in the anonymized resume corpus involves segmenting the corpus into resume snippets and clustering the resume snippets into groups. Within each group the resume snippets potentially pertain to the same individual. In addition, one or more optional filtering operations can be performed to remove snippets from a group that are less likely to be associated with the same person. This filtering is especially useful when the resume corpus is large.

22 Claims, 7 Drawing Sheets

(56) References Cited

U.S. PATENT DOCUMENTS

| | | |
|---|---|---|
| 9,448,999 B2 | 9/2016 | Lee et al. |
| 10,860,737 B2 * | 12/2020 | Dane .................. G06F 21/6227 |
| 2006/0026152 A1 * | 2/2006 | Zeng ..................... G06F 16/951 |
| 2012/0131487 A1 | 5/2012 | Leonard |
| 2014/0081995 A1 * | 3/2014 | Martin ................. G06F 16/355 |
| | | 707/750 |
| 2016/0232160 A1 * | 8/2016 | Buhrmann ......... G06Q 10/1053 |
| 2017/0200125 A1 | 7/2017 | Wang et al. |
| 2017/0262455 A1 | 9/2017 | Gallivan et al. |
| 2017/0300565 A1 * | 10/2017 | Calapodescu ......... G06F 16/353 |
| 2018/0007509 A1 | 3/2018 | William et al. |
| 2018/0225259 A1 * | 8/2018 | Alba ..................... G06F 40/237 |
| 2019/0236102 A1 | 8/2019 | Wade et al. |

OTHER PUBLICATIONS

Ihor Fesianov, Clustering, Entity extraction and similarities identification of resume texts, CoreValue, May 14, 2010, retrieved from https://corevalue.net/clustering-entity-extraction-similarities-identification-resume-texts/, pp. 1-12.

Mohan Gupta, A review of named entity recognition (NER) using automatic summarization of resumes, Towards Data Science, Jul. 9, 2018, retrieved from https://towardsdatascience.com/a-review-of-named-entity-recognition-ner-using-automatic-summarization-of-resumes-5248a75de175, pp. 1-17.

* cited by examiner

IDENTIFYING ANONYMIZED RESUME CORPUS DATA PERTAINING TO THE SAME INDIVIDUAL

BACKGROUND

An anonymized resume for the purposes of this description is an electronic textual document (such as web page, Portable Document Format (PDF) document, word processor document, and so on) in which identifying aspects that identity of the individual that is the subject of the resume have been removed or never included.

SUMMARY

Identifying anonymized resume corpus data pertaining to the same individual (resume data identification for short) is realized in implementations described herein. One general implementation takes the form of a system that includes an anonymized resume corpus data identifier having one or more computing devices, and an anonymized resume corpus data identification computer program having a plurality of sub-programs executable by the computing device or devices. The sub-programs configure the computing device or devices to access an anonymized resume corpus, segment the corpus into resume snippets, and cluster the resume snippets into groups. Within each group the resume snippets potentially pertain to the same individual.

In one exemplary implementation of the resume data identification system, the segmentation sub-program involves, for each resume in the corpus, extracting summary-level information from the resume, segmenting the resume into snippets, and then assigning the extracted summary-level information to each snippet segmented from the resume. One version of the clustering sub-program involves first using at least some of the summary-level information assigned to each snippet to cluster snippets that potentially pertain to the same individual, and then employing a textual similarity measuring technique to eliminate snippets for each group not likely to be associated with the same individual as the other snippets in the group. Another version of the clustering sub-program involves, first employing a textual similarity measuring technique to cluster the snippets into groups that potentially pertain to the same individual, and then, for each group, using at least some of the summary-level information assigned to each snippet in the group to eliminate snippets not likely to be associated with the same individual as the other snippets in the group.

Another general implementation takes the form of a computer-implemented process for identifying data in the anonymized resume corpus that pertains to the same individual. This process uses one or more computing devices to perform a number of process actions. If a plurality of computing devices is employed, the computing devices are in communication with each other via a computer network. A first of the process actions involves accessing an anonymized resume corpus. The corpus is then segmented into resume snippets, and the resume snippets are clustered into groups. Within each group the resume snippets potentially pertain to the same individual.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the resume data identification implementations described herein will become better understood with regard to the following description, appended claims, and accompanying drawings where:

DETAILED DESCRIPTION

Figure 1:
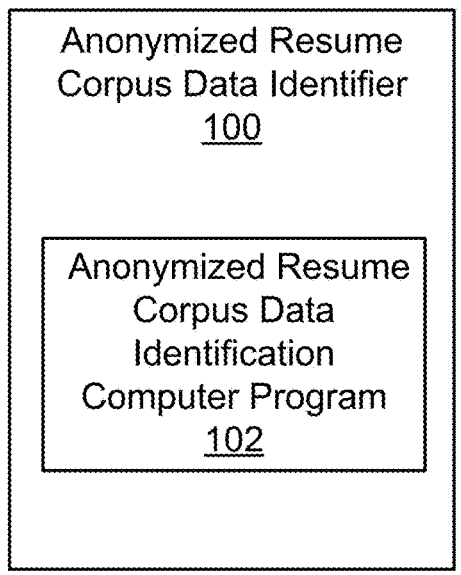
FIG. 1 is a diagram illustrating one implementation, in simplified form, of a system framework for realizing the resume data identification implementations described herein.

In the following description of resume data identification implementations reference is made to the accompanying drawings which form a part hereof, and in which are shown, by way of illustration, specific implementations in which the resume data identification can be practiced. It is understood that other implementations can be utilized, and structural changes can be made without departing from the scope of the resume data identification implementations.

It is also noted that for the sake of clarity specific terminology will be resorted to in describing the resume data identification implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "some implementations", or "one tested implementation"; or "one version", or "another version", or an "exemplary version", or an "alternate version", or "some versions", or "one tested version"; or "one variant", or "another variant", or an "exemplary variant", or an "alternate variant", or "some variants", or "one tested variant"; means that a particular feature, a particular structure, or particular characteristics described in connection with the implementation/version/variant can be included in one or more implementations of the resume data identification. The appearances of the phrases "in one implementation", "in another implementation", "in an exemplary implementation", "in an alternate implementation", "in some implementations", "in one tested implementation"; "in one version", "in another version", "in an exemplary version", "in an alternate version", "in some versions", "in one tested version"; "in one variant", "in another variant", "in an exemplary variant", "in an alternate variant", "in some variants" and "in one tested variant"; in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants of the resume data identification does not inherently indicate any particular order nor imply any limitations thereto.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," and variants thereof, and other similar words are used in either this detailed description or the claims, these terms are intended to be inclusive, in a manner similar to the term "comprising", as an open transition word without precluding any additional or other elements.

1.0 Identifying Anonymized Resume Corpus Data Pertaining to the Same Individual Identifying anonymized resume corpus data pertaining to the same individual (resume data identification for short) implementations that are described herein extract information from a corpus of anonymized resumes. In general, identifying this data in the anonymized resume corpus involves segmenting the corpus, clustering corpus segments (herein sometimes referred to as snippets), and optionally performing one or more filtering operations.

While the information may be extracted from even a small corpus, there is more to be learned from a large corpus, such as one containing millions or even billions of anonymized resumes. It is noted, however, that because the resumes are anonymized and can come from multiple databases, there is a likelihood that an aggregated corpus can include duplicate resumes associated with the same individual. Further, an individual may have multiple resumes that are created at different times. These resumes may be similar, but inevitably will present the information in different ways, and newer resumes can include new information not found in older resumes. As such, even though a series of resumes can be associated with the same individual, this fact may not be readily apparent since the individual's identity is not included. Thus, it is advantageous to identify duplicate resume data (namely data referring to the same individual) to prevent the data from adversely affecting any analysis of the resume corpus or increasing processing costs. In addition, identifying resume data that is associated with the same individual presents an opportunity to analyze differences in the data over time.

In view of the foregoing, FIG. 1 illustrates one implementation, in simplified form, of a system framework for identifying data in the anonymized resume corpus that pertains to the same individual. As exemplified in FIG. 1, the system framework includes an anonymized resume corpus data identifier including one or more computing devices 100, and an anonymized resume corpus data identification computer program 102 having a plurality of sub-programs executable by the computing device or devices of the identifier.

Figure 2:
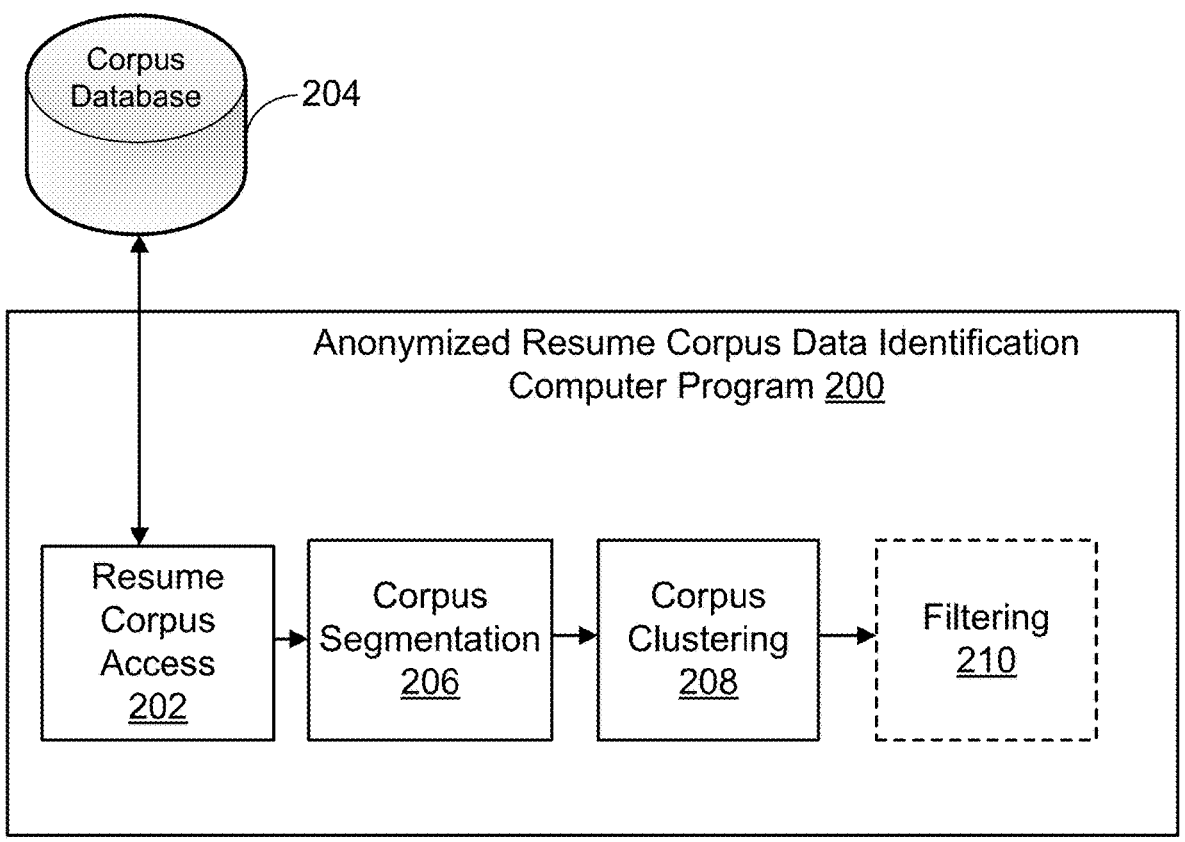
FIG. 2 is a diagram illustrating one implementation, in simplified form, of sub-programs included in the resume data identification computer program.

FIG. 2 illustrates one implementation, in simplified form, of sub-programs included in the anonymized resume corpus data identification computer program 200 that configure the aforementioned computing device or devices. More particularly, a corpus access sub-program 202 is included as shown in FIG. 2. The corpus access sub-program 202 accesses an anonymized resume corpus from a corpus database 204. The corpus database is a database of anonymized resumes, or a combination of multiple anonymized resume databases.

1.1 Segmenting the Corpus

Figure 3:
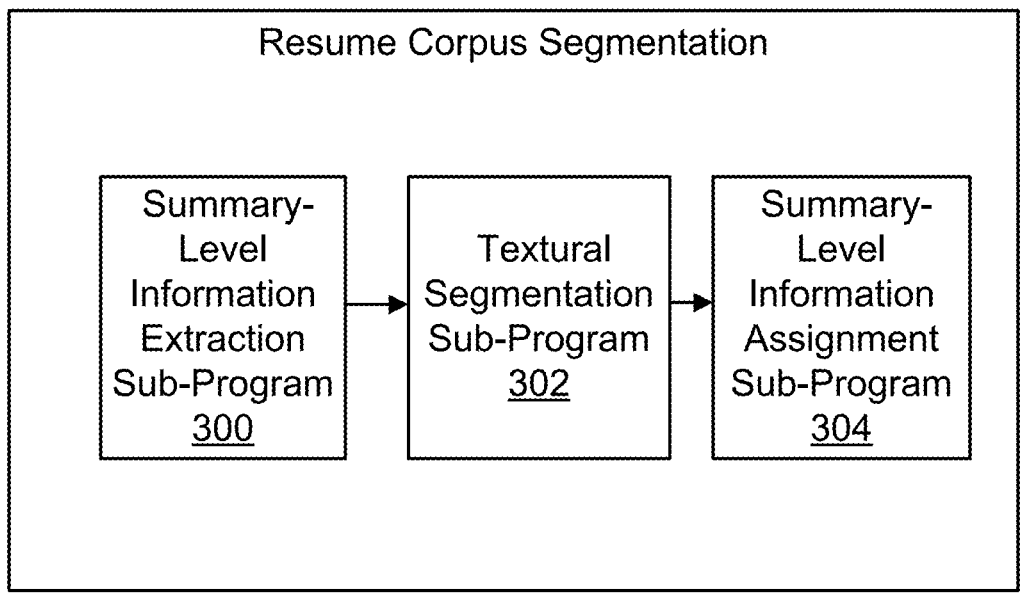
FIG. 3 is a diagram illustrating one implementation, in simplified form, of sub-programs for segmenting the resume corpus

The anonymized resume corpus data identification computer program 200 also includes a corpus segmentation sub-program 206. The sub-program 206 segments the corpus into resume snippets. More particularly, in one implementation as shown in FIG. 3, segmenting the corpus into resume snippets involves executing a summary-level information extraction sub-program 300 that extracts summary-level information on a per-resume basis from the corpus resumes. In one version, the summary-level information includes at least one of an entity that the individual who is the subject of the resume works for or is associated with, a business location of the entity that the individual who is the subject of the resume works for or is associated with, at least one calendar date associated with the resume, and a current job title associated with the individual who is the subject of the resume. In most cases, the entity will be a business entity. In one version, a uniform resource locator (URL) associated with the entity is used as its identifier. The business location can be multifaceted in that it can include a city, or a state, or a country, or any combination of these places. With regard to the calendar dates, they can take various forms. For example, but without limitation, a calendar date can be a month/day/year or a month/year or a year. A date can also be in any format. Additionally, a calendar date can be a period of time (e.g., June 2018-December 2019 or 2017-2018, or 2018-present, and so on). Further, many different dates can be associated with a resume. A date can be one that is extracted from the resume itself, such as the date the author put on the resume. The date can also be one connected with the resume, such as the date that the resume was published or submitted, or the date it was received, or the date it was entered into the resume database, among others. In one implementation, one of the extracted dates is chosen as the baseline date for the resume.

The foregoing summary-level information is typically readily identifiable in a resume and can be extracted using conventional methods. For example, a typical resume might include a label such as "current employer:" followed by the name of the entity. This entry might include the entity's URL, or it can be obtained using other means. Likewise, the entity's location may be found near the "current employer:" label. The job title might be found following a label reading "job title:" or something similar. As indicated previously, the date of the resume might be found in the resume itself or it might be included in metadata associated with the resume. Other more complex methods for extracting summary-level information are also available.

Further, while certain summary-level information items have been described above, it is not intended to limit the corpus segmenting operation to these items. Rather, one or more other summary-level information items can also be extracted in lieu of any of those items described above, or in addition to the above-described items.

Referring again to FIG. 3, segmenting the corpus into resume snippets involves executing a textural segmentation sub-program 302 that extracts textural segments on a per-resume basis from the corpus resumes. These textural segments are the aforementioned snippets. Any appropriate segmenting procedure can be employed for this purpose. Once the segmentation is complete, a summary-level information assignment sub-program 304 is executed to assign (again on a per-resume basis) the summary-level information extracted from the resume to each of the snippets extracted from the resume. For example, the summary-level information can be assigned as metadata to a snippet.

1.2 Clustering the Resume Snippets

Referring again to FIG. 2, once all the resumes in the corpus have been segmented, the anonymized resume corpus data identification computer program 200 further includes a clustering sub-program 208 to cluster the snippets. More particularly, the sub-program 208 clusters the resume snippets into groups, where within each group the resume snippets potentially pertain to the same individual. In one implementation, this involves comparing the text in each snippet to the text in the other snippets using convention textual similarity measuring techniques to find those that are similar to each other to a prescribed degree. The snippets found to be similar to each other in this manner would be deemed to be part of the same group. In another implementation, some or all of the summary-level information assigned to each snippet is used to group snippets that are potentially associated with the same individual.

Figure 4:
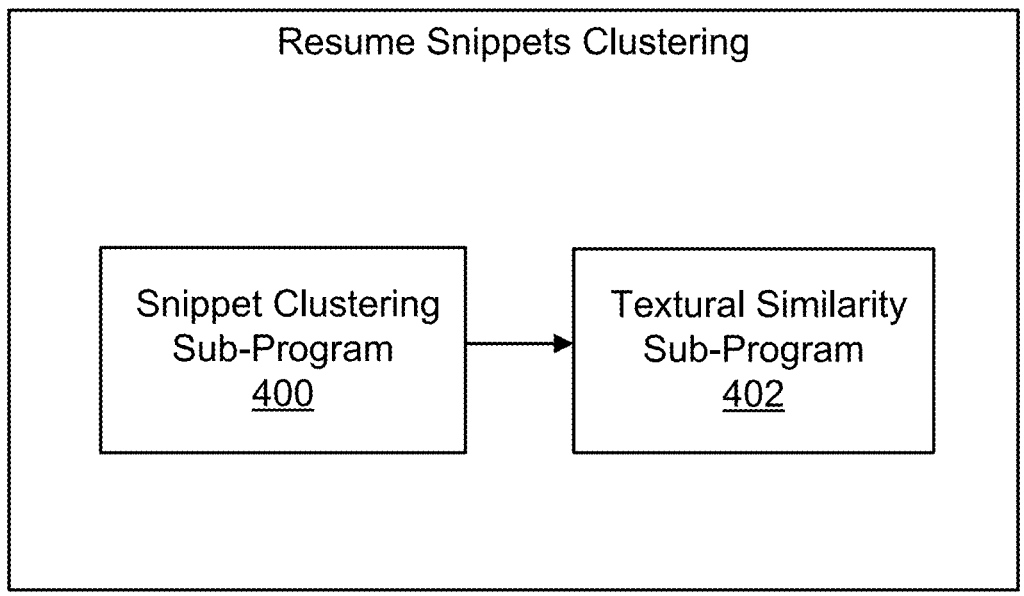
FIG. 4 is a diagram illustrating one implementation, in simplified form, of sub-programs for clustering resume snippets.

In yet another implementation, a combination approach is employed. In this implementation, the corpus clustering sub-program 208 uses the summary-level information assigned to each snippet to group snippets that are potentially associated with the same individual, and then employs a textual similarity measuring technique to eliminate snippets not likely to be associated with the same individual. More particularly, referring to FIG. 4, the corpus clustering sub-program for clustering the resume snippets into groups includes a snippet clustering sub-program 400 for first using at least some of the summary-level information assigned to each snippet to cluster snippets that potentially pertain to the same individual into groups. Then, in textural similarity sub-program 402, a textual similarity measuring technique is employed to eliminate snippets for each group not likely to be associated with the same individual as the other snippets in the group.

Figure 5:
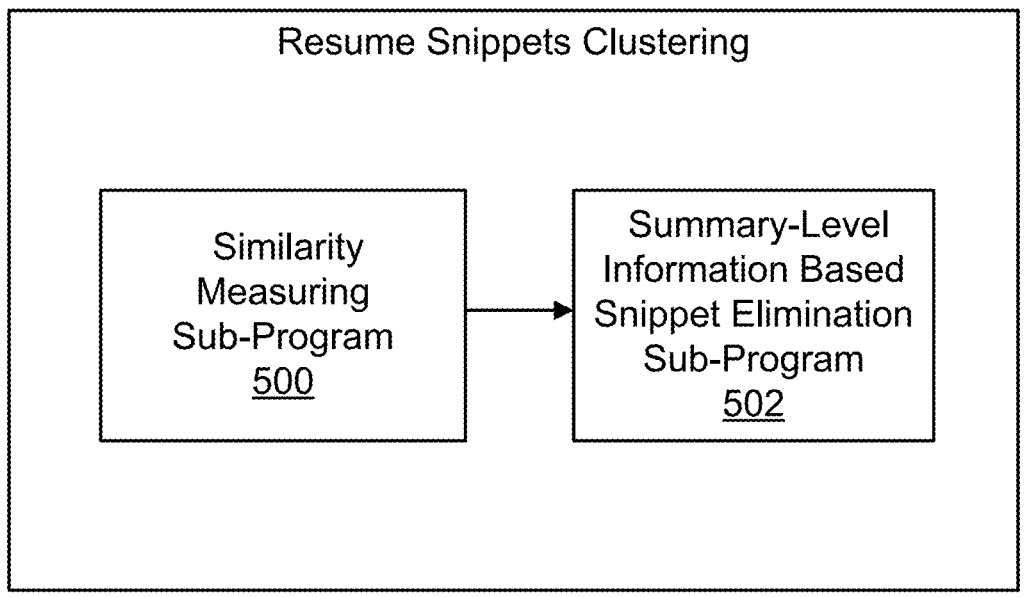
FIG. 5 is a diagram illustrating another implementation, in simplified form, of sub-programs for clustering resume snippets.

A reverse combination is also possible. In such an implementation, the text in each snippet is compared to the text in the other snippets using a convention textual similarity measuring technique to find those that are similar to each other to a prescribed degree. The snippets found to be similar to each other in this manner are assigned to the same group. Some or all of the summary-level information associated with each of the snippets in each group is then used to cull snippets not likely to be associated with the same individual. More particularly, referring to FIG. 5, the sub-program for clustering the resume snippets into groups includes a similarity measuring sub-program 500 for first employing a textual similarity measuring technique to cluster the snippets into groups that potentially pertain to the same individual. Then, in a summary-level information based snippet elimination sub-program 502, for each group, at least some of the summary-level information assigned to each snippet in the group is used to eliminate snippets not likely to be associated with the same individual as the other snippets in the group.

Figure 6:
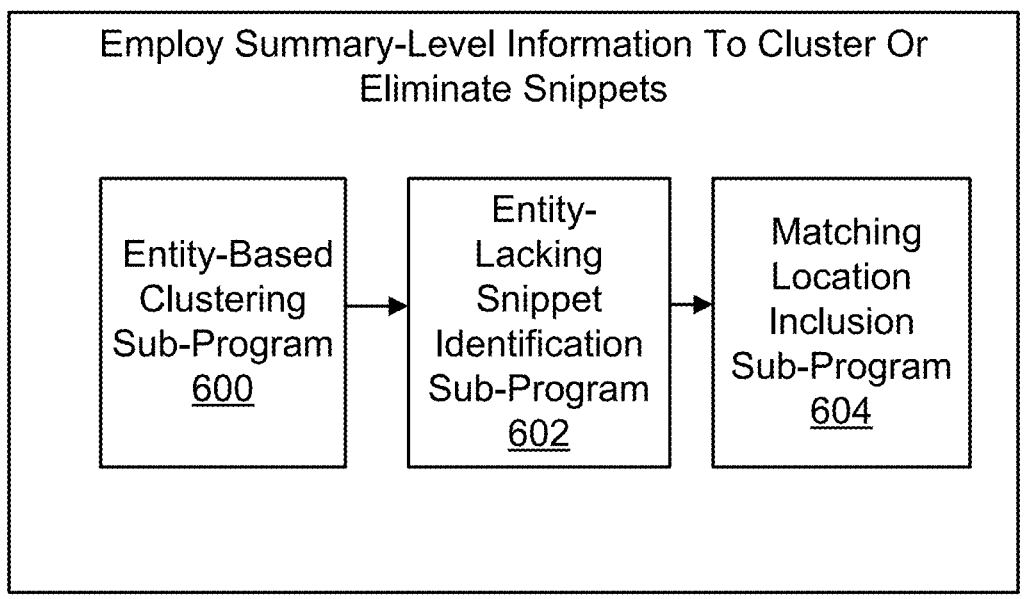
FIG. 6 is a diagram illustrating one implementation, in simplified form, of sub-programs for employing summary-level information to cluster or eliminate snippets.

One version of the foregoing implementations that employs summary-level information to cluster or eliminate snippets from a group finds snippets having the same entity assigned to them. If the snippets have the same assigned entity, they are included in the group and if not, they are excluded. Another version of the foregoing implementations that employ summary-level information to cluster or eliminate snippets from a group, finds snippets having the same location assigned to them. If the snippets have the same assigned location, they are included in the group and if not, they are excluded. It is noted that the location information can be multifaceted and not all the elements need to match to include a snippet in a group. For instance, if the location information includes a city, state and country, in one version only the state and country are employed to determine if snippets are included in the same group. This can prevent over limiting the grouping. Yet another version of the foregoing implementations that employ summary-level information to cluster or eliminate snippets from a group, finds snippets having both the same entity and the same location assigned to them. If the snippets have the same assigned entity and location, they are included in the group and if not, they are excluded. Further, in another version of the foregoing implementations that employ summary-level information to cluster or eliminate snippets from a group a two-step procedure is employed. More particularly, referring to FIG. 6, the two-step procedure first involves an entity-based clustering sub-program 600 that clustering snippets having the same entity associated with them into the same group. However, in extracting the summary-level information from a resume, it may not be possible to find all the desired items. Thus, it is possible that a snippet might have other summary-level information items associated with it (such as location), but not an entity. In such a case, rather than excluding a snippet that in missing an entity designation from a group, the location information can be consulted. Thus, an entity-lacking snippet identification sub-program 602 determines if any snippet not already assigned to the group is lacking an entity designation, and a matching location inclusion sub-program 604 assigns to the group, snippets lacking an entity designation, but having a location assigned to them that matches the location of other snippets in the group.

Figure 7:
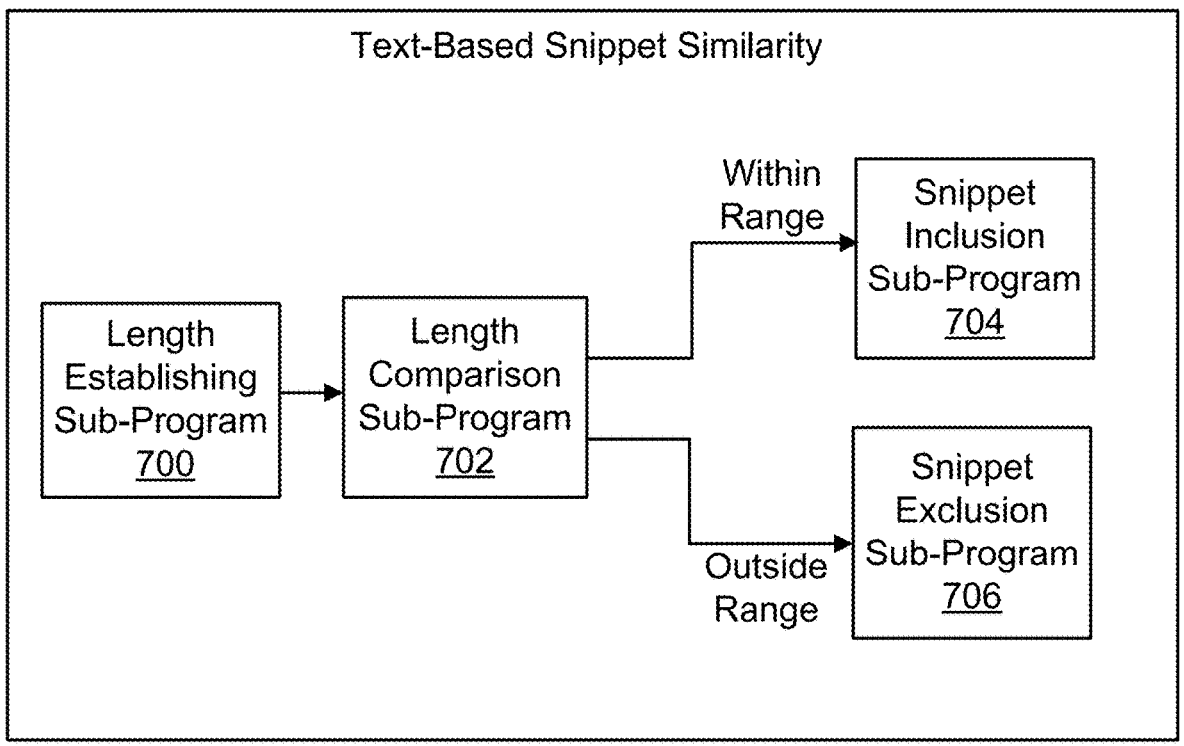
FIG. 7 is a diagram illustrating one implementation, in simplified form, of sub-programs for performing a length-based textural comparison to determine whether to include or eliminate a snippet in a group.

In implementations where the text in each snippet is compared to the text in the other snippets to find those that are similar to each other to a prescribed degree. The snippets found to be similar to each other in this manner would be deemed to be part of the same group and the others would be excluded. More particularly, referring to FIG. 7, in one implementation, the textural comparison to include or eliminate a snippet in a group involves executing a length establishing sub-program 700 that establishes a length of each snippet in a group under consideration. Then, for each snippet in a group, it is determined in a length comparison sub-program 702 if the length of the snippet falls with a prescribed comparable length range based on the length of all the snippets in the group. Whenever the length of a snippet in the group falls within the prescribed comparable length range, the snippet is deemed part of the group in a snippet inclusion sub-program 704. However, if the length of a snippet in the group falls outside the prescribed comparable length range, the snippet is excluded or removed from the group in a snippet exclusion sub-program 706. A conventional text length measurement procedure is used to establish a length of each snippet in a group in the foregoing sub-programs. In one version this involves tokenizing the snippets in a group using conventional tokenization techniques before their length is established. In this case, a snippet would be deemed to be of a comparable length if its character count falls within a prescribed range based on the character counts of all the snippets in the group.

1.3 Filtering the Groups

The result of the foregoing sub-program operations is to establish groups of snippets that are potentially associated with the same individual. These operations are designed to group the snippets without being over limiting in that snippets belonging to the same individual are excluded unnecessarily. However, when dealing with a large corpus (and so a large number of snippets) the resulting groups may end up being so large that it is unlikely all the snippets in the group could reasonable be associated with the same person. As such, in one implementation, a further group filtering is performed as shown by the optional filtering sub-program 210 in FIG. 2. The optional nature of the sub-program is indicated by the use of a broken line box.

In general, the filtering involves the use of one or a series of filtering operations. For example, in one implementation, an optional preliminary filtering followed by a core filtering operation is employed. The optional preliminary filtering is particularly advantageous when an initial group is large and reducing the number of snippets prior to performing the core filtering would reduce processing costs.

Figure 8:
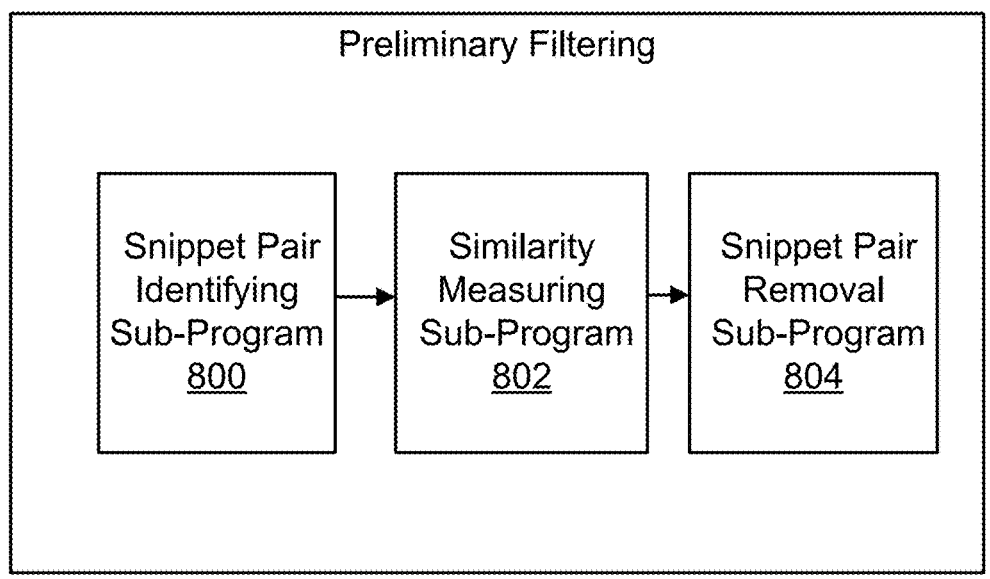
FIG. 8 is a diagram illustrating one implementation, in simplified form, of sub-programs for the preliminary filtering of snippet pairs in a group.
Figure 9:
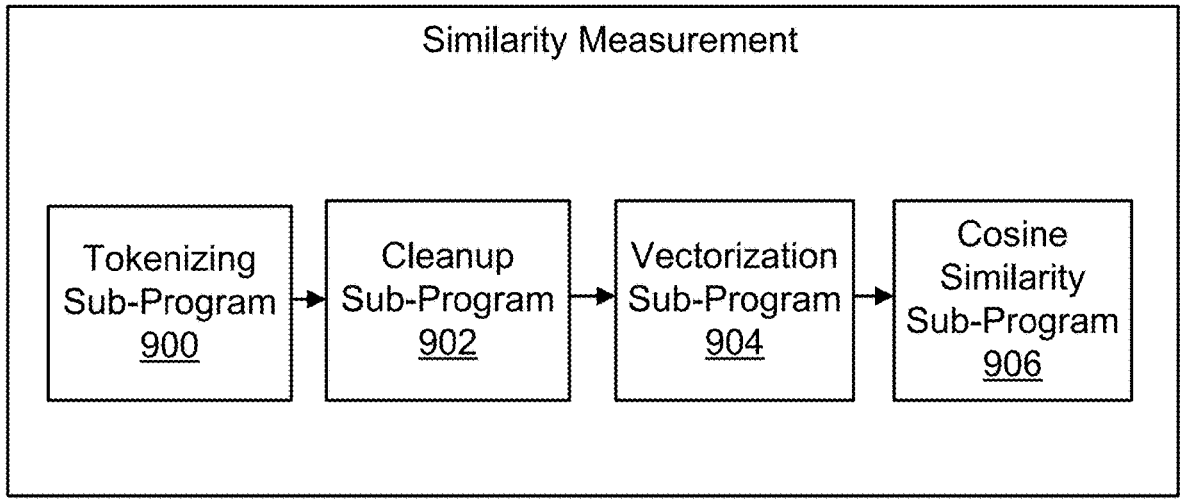
FIG. 9 is a diagram illustrating one implementation, in simplified form, of sub-programs for performing a similarity measurement between resume snippets as part of the preliminary filtering.

Referring to FIG. 8, the preliminary filtering involves, for each group, first executing a snippet pair identifying sub-program 800 to identify all possible pairs of snippets in the group under consideration. A similarity measuring sub-program 802 is then employed to measure the similarity of the snippets in each pair of snippets in the group. In one version shown in FIG. 9, this similarity testing involves employing a tokenizing sub-program 900 to tokenize each snippet in each pair of snippets in the group. It is noted that in the clustering operations described previously, some versions involved tokenizing the snippets in the groups. If this is the case, the tokenizing sub-program 900 is not executed. It is also noted that when the tokenizing sub-program 900 is executed, it can employ conventional tokenization techniques. In addition, in cleanup sub-program 902, extraneous words and symbols are removed from the tokenized snippets. For example, the signal and stop words are removed, as well as any punctuation (e.g., commas between words). A vectorization sub-program 904 is then employed to vectorize and normalize each of the tokenized snippets in the group. A standard vectorization technique can be employed for this purpose. The normalized vectors representing each of the snippets in a snippet pair are then subjected to a similarity measurement. For example, in one version shown in FIG. 9, a cosine similarity technique is applied in sub-program 906 to the vectorized snippets in each snippet pair in the group.

Referring again to FIG. 8, once the similarity of the snippets in each pair of snippets in the group have been measured, a snippet pair removal sub-program 804 is executed to remove pairs of snippets found to have a measured degree of similarity below a prescribed minimum similarity threshold from the group under consideration. For example, in the version illustrated in FIG. 9, the cosine similarity technique produces a number from 0 to 1, with larger numbers indicating greater similarity. If the cosine similarity number of a snippet vector pair is below a threshold, it is considered not similar. For example, one extreme example would only find pairs with a cosine similarity score of 0 to be dissimilar. Once all the snippet vector pairs have been assessed for similarity, only those snippets found to be in a similar pair are retained in the group.

Figure 10:
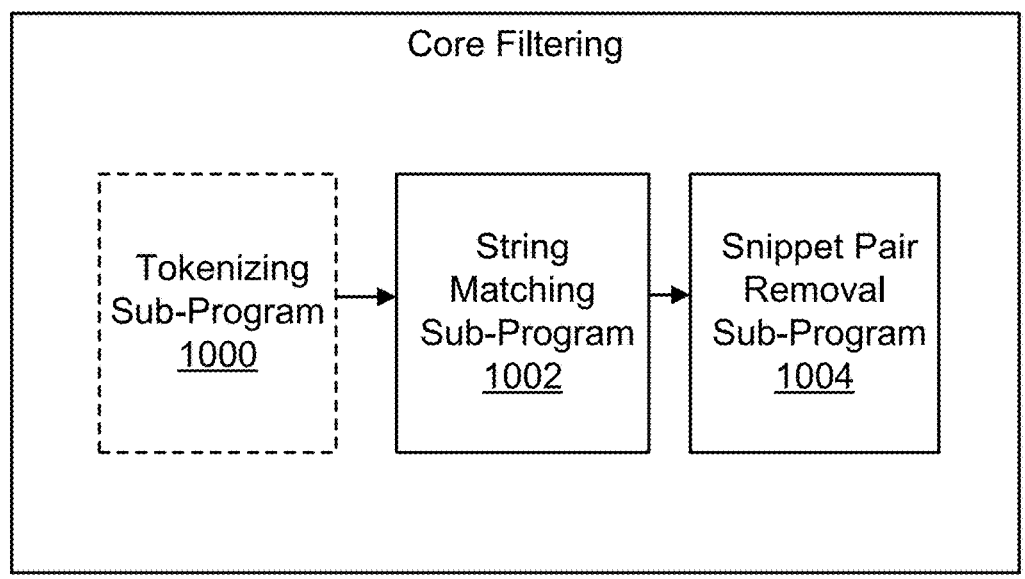
FIG. 10 is a diagram illustrating one implementation, in simplified form, of sub-programs for core filtering of snippet pairs in a group.

Whether the previously described preliminary filtering operation is employed or not, in one implementation, the aforementioned core filtering is applied. In general, the core filtering uses the tokenized snippet pairs created for each group in the preliminary filtering stage. If the preliminary filtering stage is not employed, then each group of snippets is tokenized and paired as described previously as a first step in the core filtering procedure. More particularly, as shown in FIG. 10, in one implementation an optional tokenizing sub-program 1000 is used to tokenize each snippet in each pair of snippets in the group and remove extraneous words and symbols from the tokenized snippets. This sub-program 1000 is not executed if the snippets have been previously tokenized. Next, a string-matching sub-program 1002 applies a fuzzy string-matching technique to the tokenized snippets in each snippet pair in the group to calculate the difference between the snippets in each snippet pair and produce a score. In general, a fuzzy string-matching technique finds strings (which in this case are the tokenized snippets) that match a prescribed pattern and uses a comparison algorithm (e.g., Levenstein distance algorithm) to calculate the difference between a pair of such strings to give a percentage score (e.g., 0-100% matching). For example, this string-matching sub-program 1002 can employ the FuzzyWuzzy Tokenset Ratio matching technique (or a variation thereof). Once all the tokenized snippet pairs have been assessed for similarity using a fuzzy string-matching technique, a snippet pair removal sub-program 1004 is used to remove pairs of snippets found to have a score below a prescribed minimum score threshold. For example, in one version a tokenized snippet pair is considered dissimilar and removed from the group if it has a score below a minimum score threshold of 70%.

Figure 11:
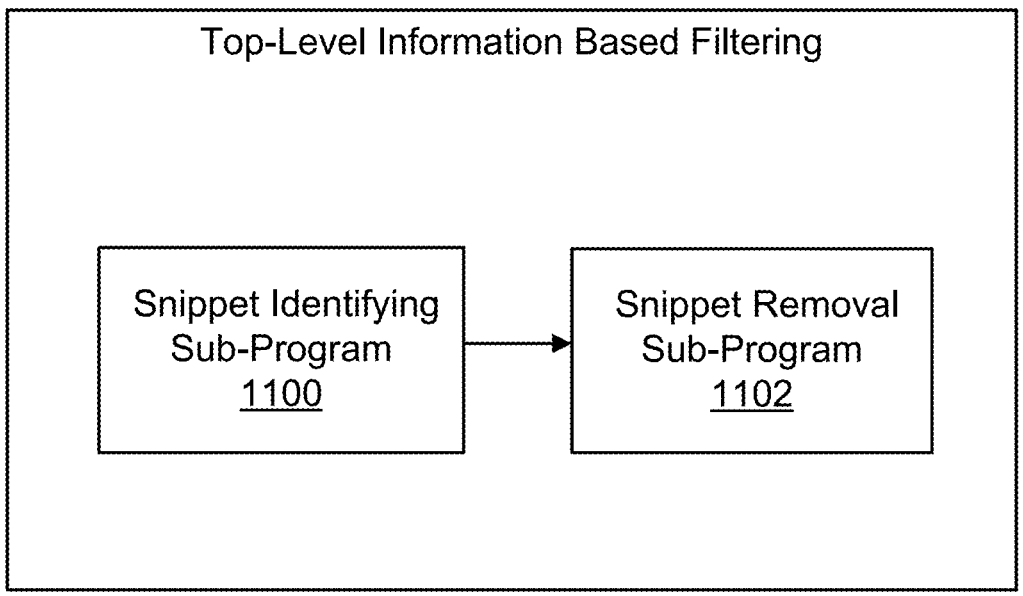
FIG. 11 is a diagram illustrating one implementation, in simplified form, of sub-programs for summary-level information based filtering of snippets in a group.

A summary-level information based filtering procedure can also be employed. This procedure can be used in lieu of the foregoing preliminary or core filtering operations, or both. Further, it is possible that even after foregoing preliminary and/or core filtering operations is performed, the resulting groups may still be so large that it is unlikely all the snippets in the group could reasonable be associated with the same person. In such a case the summary-level information based filtering procedure can be employed in addition to the other filtering operations. In one implementation illustrated in FIG. 11, the summary-level information-based filtering procedure involves using a snippet identifying sub-program 1100 for each group to identify snippets that do not have a specified part of the summary-level information assigned to it unlike other snippets in the group. This specified part can be one or more of the summary-level information items not employed to cluster the snippets. For example, in one version, the current job title associated with the individual who is the subject of the resume is employed. Once snippets that do not have the specified part of the summary-level information assigned thereto are identified, a snippet removal sub-program 1102 is used to remove these snippets from the group.

Figure 12:
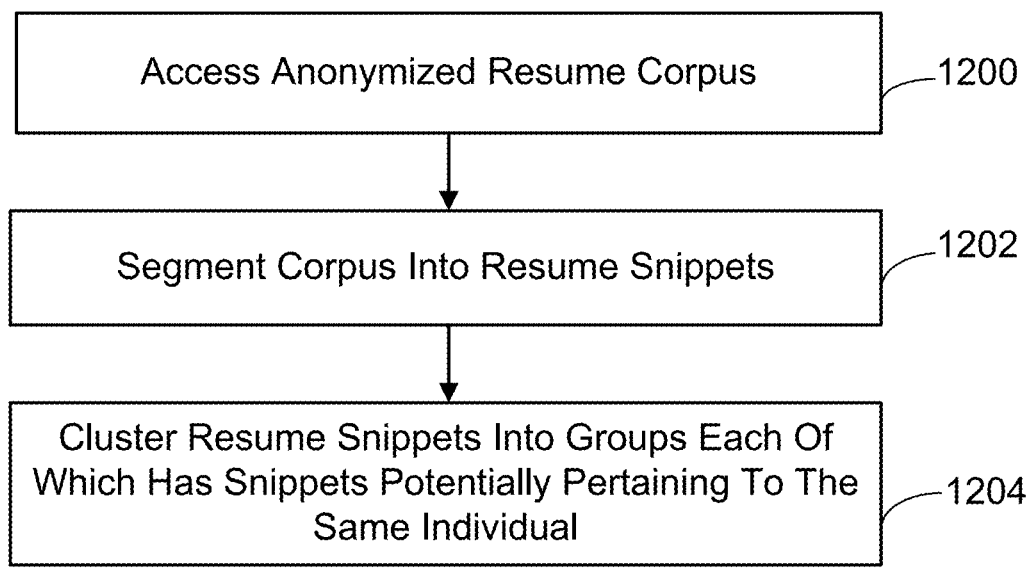
FIG. 12 is a flow diagram illustrating an exemplary implementation, in simplified form, of a process for realizing the resume data identification implementations described herein.

1.4 Process for Identifying Anonymized Resume Corpus Data Pertaining to the Same Individual FIG. 12 illustrates an exemplary implementation, in simplified form, of a process for identifying data in the anonymized resume corpus that pertains to the same individual based on the above-described anonymized resume corpus data identification computer program as realized on the system framework 100 illustrated in FIG. 1. As exemplified in FIG. 12, the process starts with accessing an anonymized resume corpus (process action 1200). Next, the corpus is segmented into resume snippets (process action 1202). The resume snippets are then clustered into groups (process action 1204). Within each of the resulting groups, the resume snippets potentially pertain to the same individual.

2.0 Other Advantages and Implementations

Once all the filtering operation are complete (if any), the resulting groups are deemed to contain snippets that are associated with the same individual. As alluded to previously, one of the summary-level information items was a date. Every snippet in a final group has a date associated with it. This provides an opportunity to analyze the changes in equivalent snippets over time if the group associated with an individual includes snippets from resumes that were created at different times. The differences can be quite illuminating. For example, if the snippets in a group refer to proficiencies in particular computer programs and applications, and a new program or application shows up in a snippet having a later date than other snippets in the group, it could be surmised that the company the individual associated with the group works for has acquired a new program or application. This is particularly true when resumes for a given entity are aggregated and compared, and show the new program or application appearing in the resumes of multiple people at about the same time. The knowledge that a company has acquired a new program or application can be employed to target marketing pertinent to the new program/application to the company, among other things. Another example would be if an earlier snippet indicated that the individual supervised 400 people, but later snippets indicate that the number has increased to 500 people. If taken at face value, this could indicate that the company the individual works for is increasing manpower in a particular project and so could indicate a new focus for the company. Also, if a group of dated snippets shows a sudden increase in the number of resumes the associated individual has submitted recently, this could indicate the individual is looking for a new job.

In addition, the overall corpus, once clustered into groups, can yield useful information. For example, since the groups are associated with individuals (even though their names are not known), it is possible to count the number of different people associated with the same entity. This can indicate the size of the entity. Further, if this information is looked at over time, it is possible to infer if a company is growing or downsizing, among other things. Still further, the number of people working in a particular job (e.g., as indicated by the job title item assigned to the snippets associated with an individual) and how this number changes over time can be useful information. For example, the number of individuals working for a company in sales or engineering, or programming, and how the numbers change over time could indicate what a company is focusing on.

While the resume data identification has been described by specific reference to implementations thereof, it is understood that variations and modifications thereof can be made without departing from the true spirit and scope. For example, while the foregoing description of the various resume data identification implementations involved the processing of anonymized resumes, these resumes need not be complete. A resume typically includes various sections and topics such as work experience, education and interests. In some applications, some of this information may not be relevant to the follow-on analysis. For instance, the analysis described previously largely involved the work experience of an individual, and not their education or interests. In such cases, rather than the entirety of an anonymized resume being processed, just the parts of interest would be considered to reduce the amount of processing required. Thus, for the purposes of the implementations described above and claimed below, the term resume is to be interpreted as either a complete anonymized resume, or a part thereof. In addition, various sub-programs and process actions described previously removed snippets from the clustered groups. In one implementation, the removed snippets can be re-evaluated and used to form new groups that satisfy the previously described criteria.

It is further noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 13:
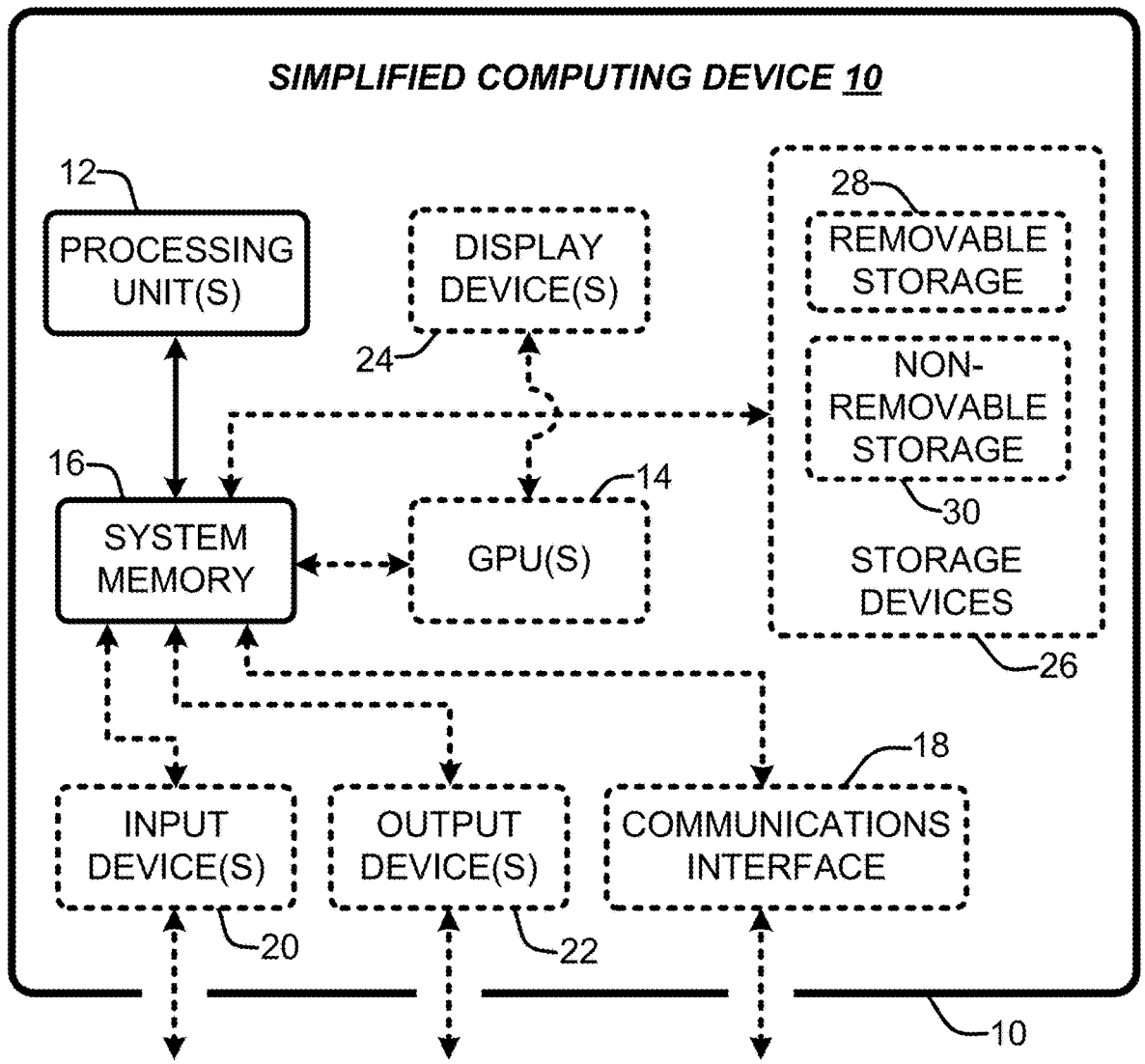
FIG. 13 is a diagram illustrating a simplified example of a general-purpose computer system on which various implementations and elements of the resume data identification, as described herein, may be realized.

The resume data identification implementations described herein are operational within numerous types of general purpose or special purpose computing system environments or configurations. FIG. 13 illustrates a simplified example of a general-purpose computer system on which various implementations and elements of the resume data identification, as described herein, may be implemented. It is noted that any boxes that are represented by broken or dashed lines in the simplified computing device 10 shown in FIG. 13 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the resume data identification implementations described herein, the device should have a sufficient computational capability and system memory to enable basic computational operations. In particular, the computational capability of the simplified computing device 10 shown in FIG. 13 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the resume data identification implementations described herein, including input, output, control, feedback, and response to one or more users or other devices or systems associated with the resume data identification implementations, are enabled by a variety of Natural User Interface (NUI) scenarios. The NUI techniques and scenarios enabled by the resume data identification implementations include, but are not limited to, interface technologies that allow one or more users user to interact with the resume data identification implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the resume data identification implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the resume data identification implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 13 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various resume data identification implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The resume data identification implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The resume data identification implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor. Still further, the resume data identification implementations described herein can be virtualized and realized as a virtual machine running on a computing device such as any of those described previously. In addition, multiple resume data identification virtual machines can operate independently on the same computer device.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. A system for identifying data in an anonymized resume corpus that pertains to the same individual, comprising:
an anonymized resume corpus data identifier comprising one or more computing devices each of which comprises one or more hardware-based processors, and an anonymized resume corpus data identification computer program having a plurality of sub-programs executable by said computing device or devices, wherein the sub-programs configure said computing device or devices to:
 access an anonymized resume corpus made up of anonymized resumes in which for each resume the name of the individual an anonymized resume pertains to is not included;
 on a per-resume basis,
  first extract a plurality of summary-level information items from the resume, said summary-level information items comprising at least one of,
   an entity that the individual who is the subject of the resume works for or is associated with, or
   a business location of the entity that the individual who is the subject of the resume works for or is associated with, wherein the business location comprises at least one of a city, or state, or country, or
   at least one calendar date associated with the resume, or
   a current job title associated with the individual who is the subject of the resume,
  then segment the resume into snippets, and
  then assign the extracted summary-level information items to each snippet segmented from the resume;
 group resume snippets which have one or more summary-level information items in common into a same group to create one or more snippet groups; and
 for each created snippet group,
  employ a textual similarity measuring technique to cluster the snippets into sub-groups, and
  designate the snippets of each sub-group as pertaining to the same individual.

2. The system of claim 1, wherein the plurality of summary-level information items comprises an entity that the individual who is the subject of the resume works for or is associated with, and wherein the entity that the individual who is the subject of the resume works for or is associated with is associated with is a business entity identified by its uniform resource locator.

3. The system of claim 1, wherein the plurality of summary-level information items comprises at least one calendar date associated with the resume, and wherein each extracted calendar date associated with the resume comprises a date the author of the resume put on the resume itself, or a date the resume was published, or a date the resume was submitted, or a date the resume was received, or a date the resume was entered into a resume database.

4. The system of claim 1, wherein the plurality of summary-level information items comprises at least one calendar date associated with the resume, and wherein one of the extracted calendar dates is assigned as the baseline date of the resume.

5. The system of claim 1, wherein the plurality of summary-level information items comprises an entity that the individual who is the subject of the resume works for or is associated with, and wherein the sub-program for grouping resume snippets having one or more of the summary-level information items in common into the same group, comprises grouping snippets having the same entity assigned to them into the same group.

6. The system of claim 1, wherein the plurality of summary-level information items comprises a business location of the entity that the individual who is the subject of the resume works for or is associated with, wherein the business location comprises at least one of a city, or state, or country, and wherein the sub-program for grouping resume snippets having one or more of the summary-level information items in common into the same group, comprises grouping snippets having at least one of a same city, or same state, or same country location assigned to them into the same group.

7. The system of claim 1, wherein the plurality of summary-level information items comprises an entity that the individual who is the subject of the resume works for or is associated with and a business location of the entity that the individual who is the subject of the resume works for or is associated with, wherein the business location comprises at least one of a city, or state, or country, and wherein the sub-program for grouping resume snippets having one or more of the summary-level information items in common into the same group, comprises grouping snippets having both the same entity and the same location assigned to them into the same group.

8. The system of claim 1, wherein the plurality of summary-level information items comprises an entity that the individual who is the subject of the resume works for or is associated with and a business location of the entity that the individual who is the subject of the resume works for or is associated with, wherein the business location comprises at least one of a city, or state, or country, and wherein the sub-program for grouping resume snippets having one or more of the summary-level information items in common into the same group, comprises:
 first grouping snippets having the same entity assigned to them into the same group,
 determining if any resume snippet not already assigned to the group is lacking an entity designation, and
 then assigning to the group, resume snippets lacking an entity designation, but having a location assigned to them that matches the location of other resume snippets in the group.

9. The system of claim 1, wherein prior to executing the sub-program for employing a textual similarity measuring technique to cluster the snippets into sub-groups, a sub-program to eliminate snippets from each created snippet group is executed, said snippet elimination sub-program comprising:
 establishing a length of each snippet in a created snippet group under consideration;
 for each snippet in the created snippet group, determining if the length of the snippet falls with a prescribed comparable length range based on the length of all the snippets in the created snippet group; and
 whenever the length of a snippet in the created snippet group falls outside the prescribed comparable length range, removing it from the created snippet group.

10. The system of claim 9, wherein the sub-program for establishing a length of each snippet in a created snippet group, comprises:
 tokenizing each snippet in the created snippet group under consideration; and
 establishing the length of each tokenized snippet as its character count.

11. The system of claim 1, wherein the anonymized resume corpus data identification computer program further comprises executing a sub-program for filtering each sub-group after executing the sub-program for employing a textual similarity measuring technique to cluster the snippets into sub-groups, said filtering comprising for each sub-group:
 identifying resume snippets in the sub-group that do not have a specified part of the summary-level information assigned thereto, which was not employed to cluster the resume snippets, in common with the other resume snippets; and removing the resume snippets from the sub-group that do not have the specified part of the summary-level information assigned thereto.

12. The system of claim 11, wherein the specified part of the summary-level information which was not employed to cluster the resume snippets comprises a current job title associated with the individual who is the subject of the resume.

13. The system of claim 1, wherein the anonymized resume corpus data identification computer program further comprises a sub-program for filtering each sub-group to remove resume snippets not likely to be associated with the same individual as other resume snippets in the group, said filtering comprising for each group, executing sub-programs for:

identifying all possible pairs of snippets in the sub-group;

measuring the similarity of the snippets in each pair of snippets in the sub-group;

removing from the sub-group, pairs of snippets found to have a measured degree of similarity below a prescribed minimum similarity threshold.

14. The system of claim 13, wherein the sub-program for measuring the similarity of the snippets in each pair of snippets in the sub-group, comprises sub-programs for:

tokenizing each snippet in each pair of snippets in the sub-group that has not already been tokenized;

removing extraneous words and symbols from the tokenized snippets;

vectorizing and normalizing each of the tokenized snippets; and applying a cosine similarity measurement technique to the vectorized snippets in each snippet pair in the sub-group.

15. The system of claim 14, wherein the sub-program for measuring the similarity of the snippets in each pair of snippets in the sub-group, further comprises additional sub-programs executed after applying the cosine similarity measurement technique and removing pairs of snippets found to have a measured degree of similarity below a prescribed minimum cosine similarity threshold, said additional sub-programs comprising:

applying a fuzzy string-matching technique to the tokenized snippets in each remaining snippet pair in the sub-group to calculate the difference between the snippets in each snippet pair and produce a score; and removing pairs of snippets found to have a score below a prescribed minimum score threshold.

16. The system of claim 15, wherein the sub-program for measuring the similarity of the snippets in each pair of snippets in the sub-group, further comprises other sub-programs executed after applying a fuzzy string-matching technique and removing pairs of snippets found to have a score below a prescribed minimum score threshold, said additional sub-programs comprising:

identifying snippets in the sub-group that do not have a specified part of the summary-level information assigned thereto, which was not employed to cluster the snippets, in common with the other snippets; and removing the snippets from the sub-group that do not have the specified part of the summary-level information assigned thereto.

17. The system of claim 16, wherein the specified part of the summary-level information which was not employed to cluster the snippets comprises a current job title associated with the individual who is the subject of the resume.

18. The system of claim 13, wherein the sub-program for measuring the similarity of the snippets in each pair of snippets in the sub-group, comprises sub-programs for:

tokenizing each snippet in each pair of snippets in the sub-group that has not already been tokenized;

applying a fuzzy string-matching technique to the tokenized snippets in each remaining snippet pair in the sub-group to calculate the difference between the snippets in each snippet pair and produce a score.

19. A system for identifying data in an anonymized resume corpus that pertains to the same individual, comprising:

an anonymized resume corpus data identifier comprising one or more computing devices each of which comprises one or more hardware-based processors, and an anonymized resume corpus data identification computer program having a plurality of sub-programs executable by said computing device or devices, wherein the sub-programs configure said computing device or devices to:

access an anonymized resume corpus made up of anonymized resumes in which for each resume the name of the individual an anonymized resume pertains to is not included;

for each resume in the corpus, first extract a plurality of summary-level information items from the resume, said summary-level information items comprising at least one of, an entity that the individual who is the subject of the resume works for or is associated with, or a business location of the entity that the individual who is the subject of the resume works for or is associated with, wherein the business location comprises at least one of a city, or state, or country, or at least one calendar date associated with the resume, or a current job title associated with the individual who is the subject of the resume, then segment the resume into snippets, and then assign the extracted summary-level information to each snippet segmented from the resume;

employ a textual similarity measuring technique to cluster the resume snippets into initial groups; and for each initial group, identify resume snippets in the initial group that do not have a specified part of the summary-level information assigned thereto in common with the other snippets, and remove the resume snippets from the initial group that do not have the specified part of the summary-level information assigned thereto to form a final group; and designate the resume snippets of each final group as pertaining to the same individual.

20. A computer-implemented process for identifying data in an anonymized resume corpus that pertains to the same individual, the process comprising the actions of:

using one or more computing devices each of which comprises one or more hardware-based processors to perform the following process actions, the computing devices being in communication with each other via a computer network whenever a plurality of computing devices is used:

accessing an anonymized resume corpus made up of anonymized resumes in which for each resume the name of the individual an anonymized resume pertains to is not included;

on a per-resume basis, first extracting a plurality of summary-level information items from the resume, said summary-level information items comprising at least one of, an entity that the individual who is the subject of the resume works for or is associated with, or a business location of the entity that the individual who is the subject of the resume works for or is associated with, wherein the business location comprises at least one of a city, or state, or country, or at least one calendar date associated with the resume, or a current job title associated with the individual who is the subject of the resume, then segmenting the resume into snippets, and then assigning the extracted summary-level information items to each snippet segmented from the resume;

grouping resume snippets which have one or more summary-level information items in common into a same group to create one or more snippet groups; and for each created snippet group, employing a textual similarity measuring technique to cluster the snippets into sub-groups, and designating the snippets of each sub-group as pertaining to the same individual.

21. The system of claim 1, wherein the anonymized resume corpus data identification computer program further comprises executing sub-programs for:

identifying duplicate snippets in each sub-group designated as pertaining to the same individual; and eliminating the identified duplicate snippets from the anonymized resume corpus.

22. The system of claim 4, wherein the anonymized resume corpus data identification computer program further comprises executing the sub-programs of:

for each sub-group designated as pertaining to the same individual, identifying differences between each resume associated with the sub-group under consideration that has a different baseline date assigned to the resume, and reporting the identified differences.

* * * * *